US009083836B2

(12) United States Patent
Inoue et al.

(10) Patent No.: US 9,083,836 B2
(45) Date of Patent: Jul. 14, 2015

(54) IMAGE FORMING APPARATUS, IMAGE FORMING METHOD, AND NON-TRANSITORY COMPUTER-READABLE MEDIUM STORING IMAGE FORMING PROGRAM

(71) Applicant: BROTHER KOGYO KABUSHIKI KAISHA, Nagoya-shi, Aichi-ken (JP)

(72) Inventors: Masafumi Inoue, Tajimi (JP); Noritaka Iwama, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/564,391

(22) Filed: Dec. 9, 2014

(65) Prior Publication Data

US 2015/0172498 A1 Jun. 18, 2015

(30) Foreign Application Priority Data

Dec. 16, 2013 (JP) ................................ 2013-258774

(51) Int. Cl.

| | |
|---|---|
| ***H04N 1/00*** | (2006.01) |
| ***B65H 7/20*** | (2006.01) |
| ***B65H 1/00*** | (2006.01) |
| ***B65H 7/06*** | (2006.01) |
| ***H04N 1/12*** | (2006.01) |
| ***H04N 1/32*** | (2006.01) |
| ***B65H 5/02*** | (2006.01) |

(52) U.S. Cl.

CPC .......... *H04N 1/00933* (2013.01); *B65H 5/021* (2013.01); *B65H 7/06* (2013.01); *B65H 7/20* (2013.01); *H04N 1/00689* (2013.01); *H04N 1/00745* (2013.01); *H04N 1/00761* (2013.01); *H04N 1/00782* (2013.01); *H04N 1/121* (2013.01); *H04N 1/32133* (2013.01); *H04N 2201/0094* (2013.01)

(58) Field of Classification Search

USPC ........................................................ 358/1.12

See application file for complete search history.

(56) References Cited

U.S. PATENT DOCUMENTS

| | | | | |
|---|---|---|---|---|
| 6,201,937 | B1 | 3/2001 | Folkins | |
| 2005/0036799 | A1 | 2/2005 | Tomita et al. | |
| 2006/0251452 | A1* | 11/2006 | Isozaki | 399/388 |
| 2012/0243014 | A1* | 9/2012 | Goto et al. | 358/1.12 |

FOREIGN PATENT DOCUMENTS

| | | | |
|---|---|---|---|
| JP | 64-053960 | A | 3/1989 |
| JP | 4316317 | A | 5/2009 |
| JP | 2013-130640 | A | 7/2013 |

* cited by examiner

*Primary Examiner* — Ngon Nguyen

(74) *Attorney, Agent, or Firm* — Merchant & Gould PC

(57) ABSTRACT

There is provided an image forming apparatus, including: an image forming unit; a sheet detector positioned on a sheet conveyance path at an upstream side of the image forming unit; a conveyance belt; an image detector; and a controller. The controller is configured to perform: detecting a front end of the sheet; forming a mark image to extend over the conveyance belt and the sheet; detecting the mark image; measuring a mark conveyance time; obtaining a time elapsed based on the mark conveyance time; and forming the image when the obtained time passes from the front end of the sheet is detected.

9 Claims, 10 Drawing Sheets

| CONDITIONS | SECOND ADJUSTMENT TIME |
|---|---|
| THIN SHEET | d1 |
| HEAVY SHEET | d2 |
| PLAIN SHEET FIRST SURFACE | d3 |
| PLAIN SHEET SECOND SURFACE | d4 |
| PLAIN SHEET MANUAL FEED | d5 |

IMAGE FORMING APPARATUS, IMAGE FORMING METHOD, AND NON-TRANSITORY COMPUTER-READABLE MEDIUM STORING IMAGE FORMING PROGRAM

CROSS REFERENCE TO RELATED APPLICATION

The present application claims priority from Japanese Patent Application No. 2013-258774 filed on Dec. 16, 2013, the disclosure of which is incorporated herein by reference in its entirety.

BACKGROUND

1. Field of the Invention

The present invention relates to an image forming apparatus, an image forming method, and a non-transitory computer-readable medium storing an image forming program. More specifically, the present invention relates to the control of start timing of image formation.

2. Description of the Related Art

There is conventionally known the following image forming apparatus forming an image on a sheet. That is, a sensor detecting whether or not the sheet is present is disposed on a sheet conveyance path at an upstream side of an image formation position, and the start timing of image formation is controlled based on the detection timing of front end of the sheet.

For example, there is known an image forming apparatus including a detecting unit which is provided between a feed roller and a transfer roller to detect whether or not a sheet is present. In this image forming apparatus, in a case that the front end of the sheet is detected, the rotations of a photosensitive drum and the transfer roller are started and a laser beam is allowed to irradiate an outer circumferential surface of the photosensitive drum.

SUMMARY

The above conventional technology, however, has the following problem. That is, the start timing of image formation may vary depending on the conveyance status of the sheet.

The present teaching has been made to solve the problem of the above conventional technology, and an object of which is to provide an image forming apparatus, an image forming method, and a non-transitory computer-readable medium storing an image forming program which are capable of preventing the variation or deviation of start timing of image formation which would be otherwise caused by the conveyance of a sheet.

According to a first aspect of the present teaching, there is provided an image forming apparatus, including:

a body having an image forming unit;

the image forming unit being configured to form an image on a sheet;

a sheet detector positioned on a sheet conveyance path at an upstream side of the image forming unit;

a conveyance belt configured to convey the sheet;

an image detector configured to detect an image formed on the conveyance belt; and a controller, wherein the controller is configured to perform:

detecting a front end of the sheet by the sheet detector;

forming a mark image to extend over the conveyance belt and the sheet conveyed by the conveyance belt;

detecting the mark image on the conveyance belt by the image detector;

measuring a mark conveyance time which is a time elapsed after a front end of the sheet is detected by the sheet detector until a rear end of the mark image is detected by the image detector;

obtaining a time elapsed based on the mark conveyance time; and forming the image by the image forming unit, when the obtained time passes from the front end of the sheet is detected by the sheet detect.

The image forming apparatus disclosed in the present description forms the mark image to extend over the conveyance unit and the sheet, and measures the time elapsed after the front end of the sheet is detected by the sheet detector until the rear end of the mark image is detected. The position of the rear end of the mark image formed to extend over the conveyance unit and the sheet corresponds to a position where the front end of the sheet is present when the sheet is opposed to the image forming unit. That is, the image forming apparatus measures a travelling time, of the front end of the sheet, between the position of the sheet detector and the position of the image detecting unit through the mark measurement process. The image forming unit may be an electro-photographic type or an ink jet type. The start of image formation means the start of exposure in the electro-photographic type and it means the start of jetting or discharge of ink in the ink jet type. A first adjustment time which will be described later may be, for example, obtained by a calculation using the mark conveyance time as a parameter, or may be read from matrix in which the mark conveyance time stored in the storage unit in advance is correlated with the first adjustment time.

That is, according to the image forming apparatus disclosed in the present description, the image formation is started based on the time obtained in the start obtaining process. In the start obtaining process, the time is obtained based on the conveyance time measured by conveying the sheet. Thus, the image formation can be started at the start timing of image formation, which is obtained by performing the adjustment, for example, with unevenness in manufacture for each product and variation or deviation of conveyance for each conveyance of sheets. Therefore, it is possible to prevent the variation of start timing of image formation which would be otherwise caused by the conveyance of sheet.

According to a second aspect of the present teaching, there is provided an image forming method of forming an image on a sheet by using an image forming apparatus, the image forming apparatus including:

a body having an image forming unit; the image forming unit being configured to form the image on the sheet;

a sheet detector positioned on a sheet conveyance path at an upstream side of the image forming unit;

a conveyance belt configured to convey the sheet; and an image detector configured to detect an image formed on the conveyance belt, the image forming method including:

detecting a front end of the sheet by the sheet detector;

forming a mark image to extend over the conveyance belt and the sheet conveyed by the conveyance belt;

detecting the mark image on the conveyance belt by the image detector;

measuring a mark conveyance time which is a time elapsed after a front end of the sheet is detected by the sheet detector until a rear end of the mark image is detected by the image detector;

obtaining a time elapsed based on the mark conveyance time; and forming the image by the image forming unit, when the obtained time passes from the front end of the sheet is detected by the sheet detector.

According to a third aspect of the present teaching, there is provided a non-transitory computer-readable medium storing a program which is executable in an image forming apparatus, the image forming apparatus including:

a body having an image forming unit; the image forming unit being configured to form the image on the sheet;

a sheet detector positioned on a sheet conveyance path at an upstream side of the image forming unit;

a conveyance belt configured to convey the sheet; and an image detector configured to detect an image formed on the conveyance belt, and a controller, the program being configured to cause the controller to perform:

detecting a front end of the sheet by the sheet detector;

forming a mark image to extend over the conveyance belt and the sheet conveyed by the conveyance belt;

detecting the mark image on the conveyance belt by the image detector;

measuring a mark conveyance time which is a time elapsed after a front end of the sheet is detected by the sheet detector until a rear end of the mark image is detected by the image detector;

obtaining a time elapsed based on the mark conveyance time; and forming the image by the image forming unit, when the obtained time passes from the front end of the sheet is detected by the sheet detector.

According to the present teaching, there is achieved the image forming apparatus which is capable of preventing the variation or deviation of start timing of image formation which would be otherwise caused by the conveyance of the sheet.

BRIEF DESCRIPTION OF THE DRAWINGS

FIG. 7 is an illustrative view illustrating an exemplary table for a second adjustment time.

DESCRIPTION OF THE EMBODIMENTS

An embodiment in which an image forming apparatus of the present teaching is substantiated will be described below in detail while referring to the accompanying drawings. This embodiment is an embodiment in which the present teaching is applied to a multifunction peripheral (MFP) provided with an image forming function.

Figure 1:
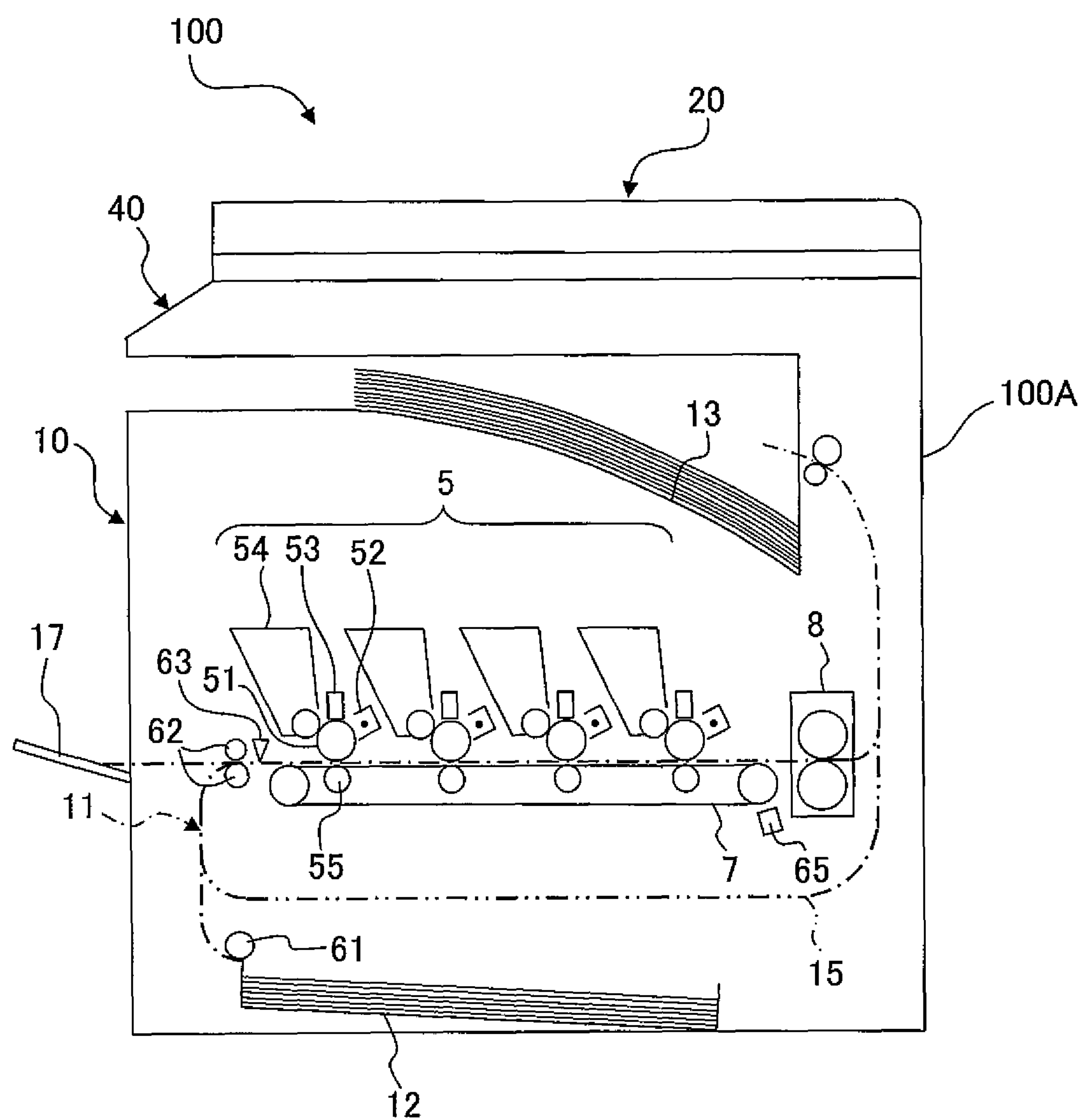
FIG. 1 is a cross-sectional view of a schematic structure of an MFP according to an embodiment.

As depicted in FIG. 1, an MFP 100 of this embodiment includes a main body 100A which has an image forming unit 10 which prints an image on a sheet, a document reading unit 20 which scans or reads the image of a document, and an operation panel 40 which displays an operation status and receives or accepts the input operation of a user.

The image forming unit 10 includes a process unit 5 which forms a toner image on a sheet in accordance with an electro-photographic manner; a conveyance belt 7 which conveys the sheet in a position facing the process unit 5; and a fixing unit 8 which fixes a toner image, which is not yet fixed on the sheet, onto the sheet. The process unit 5 includes a photoconductor or photoreceptor 51, a charging unit 52, an exposure unit 53, a developing unit 54, and a transfer unit 55 for each of colors of yellow (Y), magenta (M), cyan (C), and black (K). The process unit 5 is an exemplary image forming unit. The conveyance belt 7 is an exemplary conveyance unit.

The MFP 100 includes a conveyance path 11 via which the sheet is conveyed to the conveyance belt 7, a feed tray 12 which loads sheets for printing, a discharge tray 13 on which the sheet for which the printing has been performed is placed, a reverse conveyance path 15 used in double-sided or duplex printing, and a manual feed tray 17. The conveyance path 11 and the reverse conveyance path 15 are formed in the main body 100A. For example, the sheet for printing is fed from the feed tray 12 or the manual feed tray 17 to the conveyance path 11, is allowed to pass through the conveyance belt 7 and the fixing unit 8, and is discharged on the discharge tray 13. In the double-sided printing, the sheet having a first surface for which the printing has been performed is allowed to pass through the reverse conveyance path 15, is conveyed again to the conveyance path 11 in a state that the sheet is inverted upside down, and the printing is performed on a second surface of the sheet.

The MFP 100 further includes a feed roller 61, a registration roller pair 62, and a registration sensor 63 on an upstream side of the process unit 5 in a sheet conveyance direction in this order from the upstream side. The feed roller 61 feeds each sheet loaded in the feed tray 12 to the conveyance path 11. The registration roller pair 62 conveys the sheet to the process unit 5 while correcting the oblique travel of the fed sheet. The registration sensor 63 detects whether or not the sheet is present at a position between the registration roller pair 62 and the process unit 5. The registration sensor 63 will be described later. The registration sensor 63 is an exemplary sheet detector.

The registration roller pair 62 has two rollers which are arranged parallel to each other in a direction perpendicular to the conveyance direction of the conveyance path 11 in a state of being brought into contact with each other under pressure. That is, the direction in which the two rollers of the registration roller pair 62 are brought into contact with each other under pressure is perpendicular to the conveyance direction of the sheet. The registration roller pair 62 is controlled to be switchable between a drive and a stop. The registration roller pair 62 in a stop state does not allow the sheet to enter a nip position where the sheet is nipped by the two rollers. The oblique travel of the sheet in a plane is corrected by letting the sheet abut against the registration roller pair 62 in the stop state. The nip position of the registration roller pair 62 is an exemplary predetermined position.

As depicted in FIG. 1, the path of the sheet fed from the manual feed tray 17 also joins the conveyance path 11 on the upstream side of the registration roller pair 62. The path of the sheet to be used when the printing for the second surface is performed in the double-sided printing joins the conveyance path 11 on the upstream side of the registration roller pair 62 after passing through the reverse conveyance path 15. That is, all of the sheets to be printed pass through the positions of the registration roller pair 62 and the registration sensor 63 before arriving at the process unit 5. Each of the sheet paths leading to the position of the registration roller pair 62 is an exemplary conveyance path. For example, each of the path from the feed tray 12, the path from the manual feed tray 17, and the path from the reverse conveyance path 15 is an exemplary conveyance path.

The MFP 100 further includes a belt sensor 65 to detect whether or not the toner on the conveyance belt 7 is present. The conveyance belt 7 is an endless belt which is moved to rotate by a plurality of belt rollers. The sheet is conveyed by the conveyance belt 7 to pass through a part, on the conveyance belt 7, which faces the process unit 5. The belt sensor 65 is provided at a position where the belt sensor 65 does not face the process unit 5, but faces the conveyance belt 7. That is, no sheet is allowed to pass on the part, of the conveyance belt 7, facing the belt sensor 65. The belt sensor 65 is, for example, an optical sensor to optically detect the toner. The belt sensor 65 is an exemplary image detecting unit.

The document reading unit 20 includes an image sensor for optically scanning or reading an image to obtain image data based on the reflection of light at each position of the document. The scanning type of the document reading unit 20 may be a CCD type or CIS type. The document reading unit 20 can perform a color reading operation or may perform a monochrome reading operation only. The operation panel 40 includes, for example, a liquid crystal display and a button group constructed of a start key, a stop key, a numerical key pad, and the like. The operation panel 40 accepts the instruction input by the user.

Subsequently, the registration sensor 63 of the MFP 100 will be explained. The registration sensor 63 detects whether or not the front end of the sheet, which is conveyed from the registration roller pair 62, has passed. In the MFP 100 of this embodiment, the detection timing of the sheet by the registration sensor 63 includes errors due to the conveyance path of the sheet leading to the registration roller pair 62, the type of sheet to be conveyed, the status of sheet at the time of conveyance, and the like. For example, the sheet may be curled when the printing is performed on the second surface in the double-sided printing. The sheet in a state of being curled may be detected by the registration sensor 63 at a timing different from the detection timing of the sheet in a state of not being curled. That is, the detecting timing of sheet by the registration sensor 63 includes an error due to an existence or non-existence of the curl of the sheet.

Figure 2:
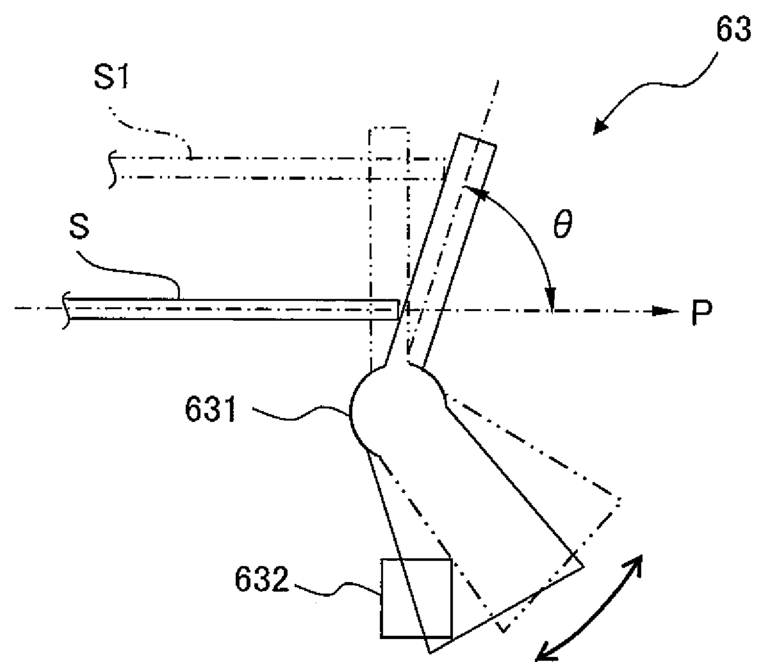
FIG. 2 is an illustrative view illustrating a registration sensor.

In a case that a sensor, as depicted in FIG. 2, which detects the passage of the sheet based on the pressure of the sheet is used as the registration sensor 63, the detection timing further includes a peculiar error. The registration sensor 63 depicted in FIG. 2 includes a rotatable detection piece 631 and an optical path 632 formed by a light-emitting element and a light-receiving element arranged in a direction perpendicular to the sheet surface. The registration sensor 63 detects the sheet in a case that the detection piece 631 is rotated by the pressure of the sheet to block the optical path 632.

As depicted in FIG. 2, the detection piece 631 of the registration sensor 63 at a position where a detection signal is switched between an on-state and an off-state forms an angle θ which is non-orthogonal to a conveyance direction P of the sheet. Thus, as for the sheet which has passed through a position different from the position of a reference sheet S, such as a sheet S1 depicted by two-dot chain lines in FIG. 2, the registration sensor 63 could detect the front end of the sheet (S1) at a timing different from the timing of the reference sheet S. The difference in the positions where the sheets are allowed to pass is caused, for example, by the difference in the conveyance paths of sheets loading to the registration roller pair 62 and the difference in types of sheets.

In a case that a sheet with low stiffness is used, the sheet itself might bend before the detection piece 631 is rotated sufficiently. The bending of sheet is more likely to be eliminated after the sheet in a state of being bent is detected by the registration sensor 63, and then the sheet having no bending is allowed to travel. That is, the detection timing of the sheet by the registration sensor 63 is likely to include the errors caused by the difference in conveyance paths of sheets and the difference in types of sheets.

The registration roller pair 62 is disposed to have the positional relation perpendicular to the conveyance direction P of the sheet. Thus, unlike the detection timing of the registration sensor 63, the timing at which the sheet is started to be conveyed from the registration roller pair 62 is less likely to be affected by the type of sheet and the conveyance path of sheet. That is, any sheet abutting against the two rollers of the registration roller pair 62 is started to be conveyed at the substantially same timing as the start timing of driving of the registration roller pair 62.

The belt sensor 65 detects the toner on the conveyance belt 7 at a position where the belt sensor 65 is fixed to the conveyance belt 7. No sheet is conveyed to the detection position of the belt sensor 65. That is, unlike the registration sensor 63, the detection timing of the belt sensor 65 is less likely to be affected by the type of sheet and the conveyance path of sheet. The detection error is small compared with that of the registration sensor 63.

Figure 3:
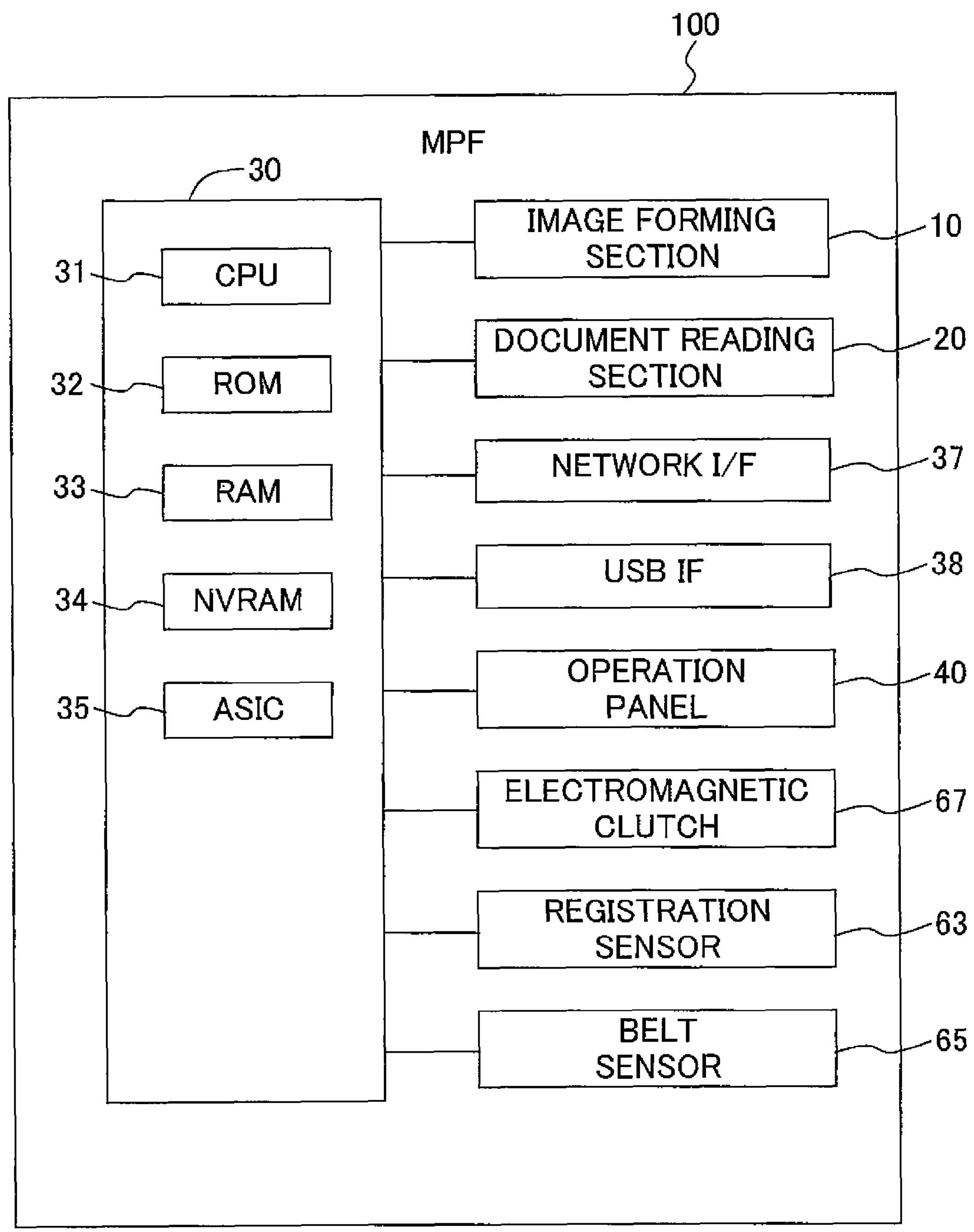
FIG. 3 is a block diagram depicting an electrical configuration of the MFP.

Subsequently, the electrical configuration of the MFP 100 will be explained. As depicted in FIG. 3, the MFP 100 is provided with a controller 30 including a CPU 31, a ROM 32, a RAM 33, a NVRAM (non-volatile RAM) 34, and an ASIC 35. The MFP 100 further includes the image forming unit 10, the document reading unit 20, a network interface 37, a USB interface 38, the operation panel 40, an electromagnetic clutch 67, the registration sensor 63, and the belt sensor 65. These are electrically connected to the controller 30.

Various control programs for controlling the MFP 100, various settings, initial values, and the like are stored in the ROM 32. The RAM 33 is to be used as a work area in which various control programs are read out, or a storage area in which data is to be stored temporarily. The CPU 31 controls each of the components of the MFP 100 while storing a processing result in the RAM 33 or the NVRAM 34 in accordance with the control program read from the ROM 32.

The network interface 37 is hardware which enables communication with a network via a LAN cable and the like. The USB interface 38 is hardware which enables communication with a device connected via a USB cable and the like.

The CPU 31 is an exemplary controller. The controller 30 may be the controller, or the ASIC 35 may be the controller. Or, some or all of these components may configure the controller to work together. The controller 30 in FIG. 3 is a general term for the hardware used for controlling the MFP 100 such as the CPU 31. The controller 30 does not necessarily mean a single hardware which is actually present in the MFP 100. The NVRAM 34 is an exemplary storage unit.

The electromagnetic clutch 67 transmits or interrupts the driving force from a drive motor for driving the registration roller pair 62 to the rotational shaft of the registration roller pair 62. That is, in the MFP 100, the driving signal of the electromagnetic clutch 67 is switched from the off-state to the on-state to connect the electromagnetic clutch 67, and thereby making it possible to start the rotation of the registration roller pair 62.

Subsequently, an image forming operation in the MFP 100 will be explained. At the time of image formation, the toner image is formed on the surface of the photoconductor 51 by the process unit 5 in accordance with the electro-photographic manner. That is, the photoconductor 51 is charged by the charging unit 52 and is exposed by the exposure unit 53. Accordingly, an electrostatic latent image based on printing data is formed on the photoconductor 51. Next, the toner is supplied to the electrostatic latent image by the developing unit 54 to form the toner image on the photoconductor 51.

The sheet for printing is conveyed to the conveyance path 11 from the feed tray 12 or the like, and the oblique travel of the sheet is corrected by the registration roller pair 62. Then, the sheet is conveyed to the conveyance belt 7. On the way to the conveyance belt 7, the front end of the sheet is detected by the registration sensor 63. After the detection of the front end of the sheet by the registration sensor 63, the sheet is conveyed by the conveyance belt 7 to a position where the sheet faces the process unit 5. The toner image formed on the photoconductor 51 is transferred to the sheet by the transfer unit 55. Thereafter, the sheet on which the toner image is placed is away from the conveyance belt 7 to arrive at the fixing unit 8, and the toner image is fixed to the sheet by the fixing unit 8.

As described above, in the MFP 100, the start timing of image formation is controlled based on the detection timing of the front end of the sheet by the registration sensor 63 while the sheet and the toner image are moved to perform alignment or positional adjustment at the transfer position. For example, a blank space having an appropriate width is provided at the front end of the sheet, and the image formation is started depending on the conveyance position of the sheet to form the image at an appropriate position on the sheet. Thus, for example, a reference value of waiting time elapsed after the passage of the front end of the sheet is detected by the registration sensor 63 till the exposure with the exposure unit 53 is started is set for each model.

However, the detection timing of the sheet by the registration sensor 63 includes various errors. Thus, a reference waiting time set for each model and an adjustment time for correcting each of the errors are stored in the NVRAM 34 of MFP 100. At the time of the image formation, the reference waiting time and the adjustment time are read out from the NVRAM 34, and the start timing of the image formation is determined based on the time obtained by correcting the reference waiting time with the adjustment time.

In particular, the detection timing of the sheet by the registration sensor 63 includes an error for each individual product based on individual differences, even in the same model of apparatus, due to, for example, unevenness in manufacture of components and/or unevenness in arrangement at the time of assembly of the components. Further, as described above, the error based on the conveyed sheet occurs even in the same product due to the type of sheet, the conveyance path of sheet, and the like. Thus, two kinds of values are stored in the MFP 100 as the adjustment time, the values including a first adjustment time based on the individual difference and a second adjustment time based on the conveyed sheet.

Figure 4:
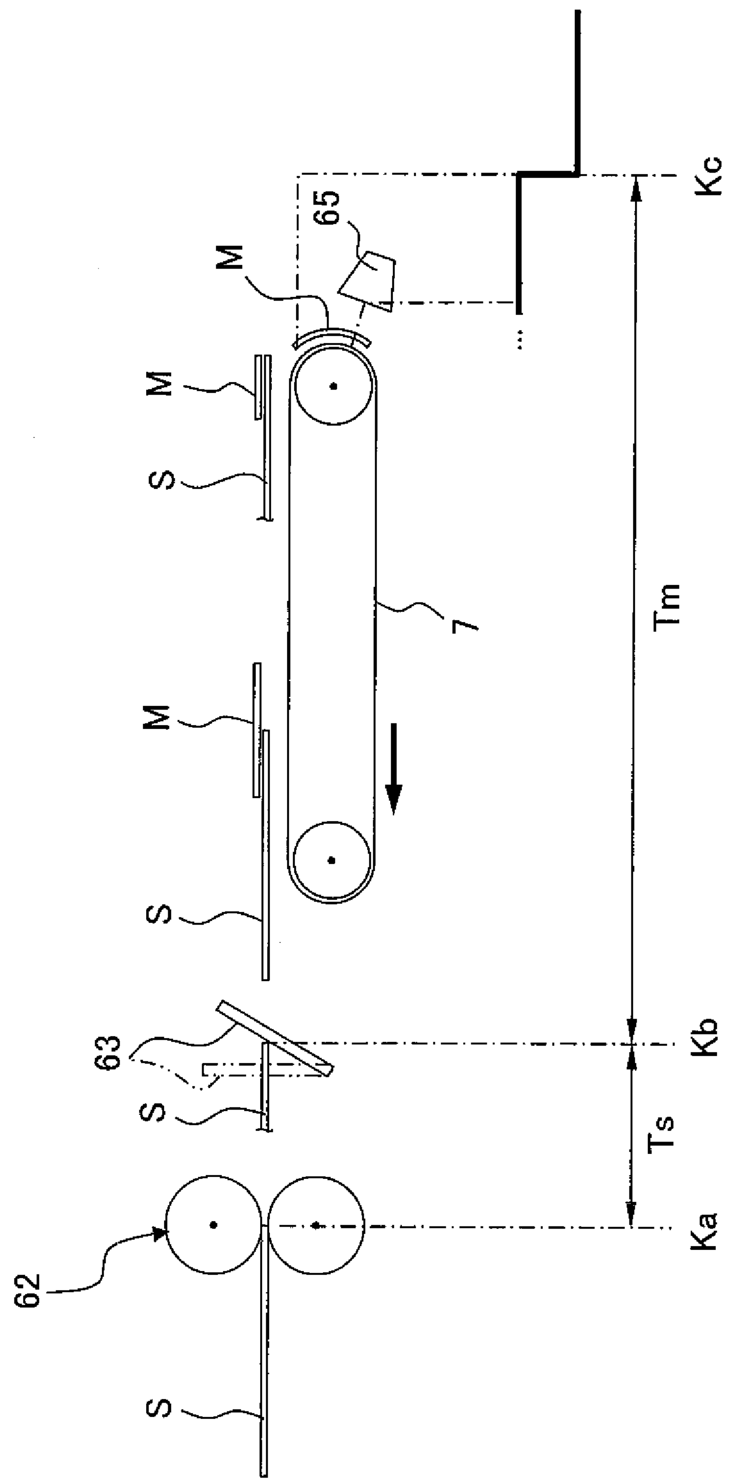
FIG. 4 is an illustrative view illustrating the relation among various kinds of timing in a mark measurement test.

Subsequently, an explanation will be made about a method for obtaining the adjustment time in the MFP 100 of this embodiment. As schematically depicted in FIG. 4, a mark measurement test is performed on each MFP 100 before the shipment to obtain the adjustment time.

In the mark measurement test, one sheet (sheet S in FIG. 4) is fed, and a mark M is formed by the process unit 5 to extend over the front end of the sheet S and the conveyance belt 7. That is, the exposure of the mark M is started at a point before the start time of exposure which corresponds to the front end of the sheet. The position of the mark M, in a plane of the sheet, in a direction perpendicular to the conveyance direction of the sheet may be any position which can be detected by the belt sensor 65. The length of the mark M in the conveyance direction may be any length provided that the mark M can extend across the sheet and the conveyance belt 7.

In the MFP 100, each of the units is controlled similar to the normal printing process. Accordingly, the sheet is away from the conveyance belt 7 to be moved to the fixing unit 8 (see FIG. 1). Thereafter, the formed mark M is detected by the belt sensor 65. That is, the belt sensor 65 detects a portion, of the mark M formed to extend over the sheet and the conveyance belt 7, formed on the conveyance belt 7.

Figure 5:
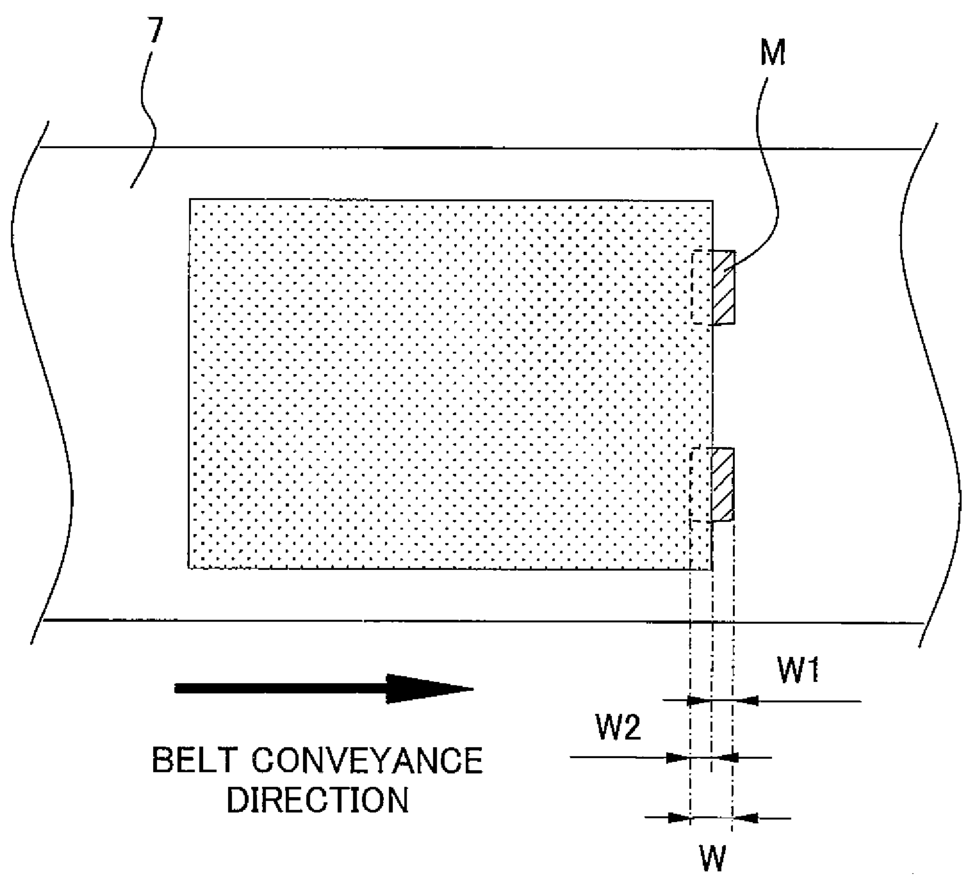
FIG. 5 is an illustrative view illustrating marks.

Specifically, as depicted in FIG. 5, only a portion, of the mark M having a predetermined length W, which is formed on the conveyance belt 7 to have a length W1 is detected by the belt sensor 65, and a portion which is formed on the sheet to have a length W2 is moved to the fixing unit 8 together with the sheet. Thus, the position of the rear end of the mark M detected by the belt sensor 65 corresponds to a position where the front end of the sheet was present. Each of the lengths W, W1, W2 is a length in the conveyance direction of the sheet and the conveyance belt 7. In FIG. 5, a range in which the sheet was placed is indicated by dot-hatching.

In the mark measurement test performed on the MFP 100, a sensor time Ts and a mark time Tm depicted in FIG. 4 are obtained by use of a timer. The sensor time Ts is a time elapsed after a timing Ka at which the driving of the registration roller pair 62 is started till a detection timing Kb at which the front end of the sheet is detected by the registration sensor 63. The mark time Tm is a time elapsed after the detection timing Kb at which the front end of the sheet is detected by the registration sensor 63 till a time Kc at which the rear end of the mark on the conveyance belt 7 is detected by the belt sensor 65. The mark time Tm is an exemplary mark conveyance time. The sensor time Ts is an exemplary measurement time.

In the mark measurement test, it is sufficient that the timing at which the rear end of the mark is detected by the belt sensor 65 is obtained. That is, the belt sensor 65 only has to detect the rear end of the mark and is not required to measure the length of the mark. Thus, the timing at which the detection by the belt sensor 65 is started is not limited. The detection may be started within a period in which the mark M is present at the detection position by the belt sensor 65.

The conveyance time of the sheet by the conveyance belt 7 from the position where the sheet faces the process unit 5 to the position where the detection is performed by the belt sensor 65 is previously known as a design value. Thus, an actual waiting time can be calculated based on the mark time Tm obtained in the mark measurement test, the actual waiting time being a time actually required to convey the sheet from the position of the detection timing Kb where the front end of the sheet is detected by the registration sensor 63 to the position where the sheet faces the process unit 5. The position where the sheet faces the process unit 5 is a transfer position where the transfer of the image is performed on the sheet by the process unit 5.

In the MFP 100, the mark time Tm and the sensor time Ts are measured in the mark measurement test performed on own apparatus. The first adjustment time and the second adjustment time are obtained from the obtained mark time Tm and the sensor time Ts obtained in the same test. Further, the obtained first adjustment time and second adjustment time are stored in the NVRAM 34.

Then, the difference between the actual waiting time calculated based on the measured mark time Tm and the reference waiting time stored in advance is calculated in the MFP 100, and the obtained difference is used as the first adjustment time. Or, the following manner is also allowable. That is, the reference mark time is calculated from the reference waiting time, and the first adjustment time is obtained from the reference mark time and the mark time Tm. The first adjustment time is an adjustment time for addressing the error of own apparatus as an individual product.

As described above, the detection timing of the sheet by the registration sensor 63 could include the errors caused by the type of sheet and the conveyance path of sheet. That is, the detection timing Kb obtained in the mark measurement test could also include the errors. On the other hand, the error between the timing Ka at which the driving of the registration roller pair 62 is started and a timing at which the conveyance of sheet is actually started is very small. Thus, the second adjustment time is obtained by use of the sensor time Ts in the MFP 100.

Figure 6:
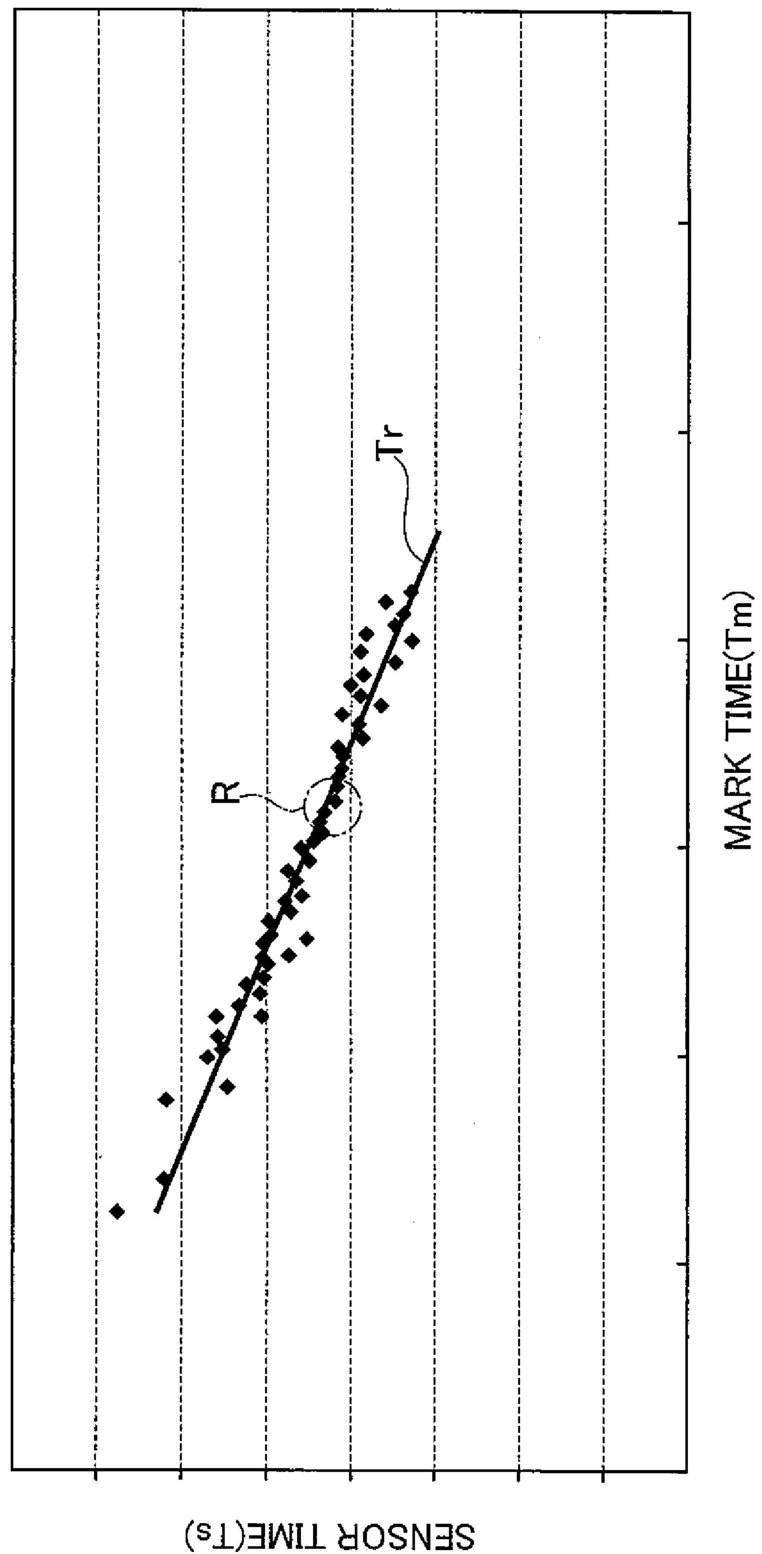
FIG. 6 is a graph depicting the relation between a mark time and a sensor time.

The inventors conducted experiments by using a plurality of MFPs 100, and found out that there was a certain linear relationship between the sensor time Ts and the mark time Tm for each model. For example, in the same model of MFPs 100, the relationship between the sensor time Ts and the mark time Tm is aggregated in the straight line Tr as depicted in FIG. 6. The straight line Tr is represented by the following expression 1. $\alpha$ and $\beta$ in the equation 1 are inherent values set in the MFP 100 for each model.

$$Ts=Tm\times\alpha+\beta \quad \text{[Equation 1]}$$

In each individual MFP 100, individual error along the straight line Tr occurs with respect to the reference value for each model due to the unevenness in manufacture of components and/or unevenness in arrangement at the time of assembly of the components. The reference value for each model is depicted, for example, by circle R in FIG. 6. Further, in a case that the measurement is performed on each MFP 100, the variation or deviation of detection by the registration sensor 63 due to the conveyance of the sheet occurs. This brings the error in a direction away from the straight line Tr.

Thus, the second adjustment time is obtained in the MFP 100 based on the mark time Tm obtained in the mark measurement test performed on own device, and the sensor time Ts obtained in the same test. Specifically, a corresponding reference sensor time Ts0 is calculated from the obtained mark time Tm in accordance with the expression 1. Then, the difference between the measured sensor time Ts and the reference sensor time Ts0 is used as the second adjustment time.

As described above, the second adjustment time is more likely to vary according to the type of sheet and the conveyance path of sheet. Thus, the second adjustment times for respective various conditions are obtained in the MFP 100. For example, as depicted in FIG. 7, the second adjustment times are stored in the NVRAM 34 as a table 341. The various conditions are, for example, as follows: regarding the types of sheets, the sheet is distinguished as a plain sheet, a thin or light sheet, or a thick or heavy sheet; regarding the conveyance paths of the sheet, the conveyance path is distinguished as feeding from the feed tray 12 or the feeding from the manual feed tray 17; regarding the surfaces to be printed in the double-sided printing, the surface to be printed is distinguished as the first surface or the second surface.

At the time of image formation, the individual first adjustment time and the second adjustment time corresponding to the printing condition are read out from the NVRAM 34 in the MFP 100. Then, the time elapsed after the front end of the sheet is detected by the registration sensor 63 till the exposure is started is determined based on the time obtained by adjusting the reference waiting time for each model with the first adjustment time and the second adjustment time.

In the MFP 100, the time elapsed after the detection timing Kb of the front end of the sheet by the registration sensor 63 till the start of image formation by the process unit 5 can be also obtained based on the mark time Tm obtained in the mark measurement test. As described above, the actual waiting time is calculated in the MFP 100 based on the mark time Tm obtained in the mark measurement test. Then, based on the calculated actual waiting time, the time elapsed after the detection timing Kb till the start of exposure can be obtained by taking the time elapsed after the start of exposure till the start of transfer and the time elapsed after the front end of the sheet is conveyed to the transfer position till the sheet is conveyed by an amount of blank space of the front end into account.

In this case, the second adjustment time and the obtained time elapsed after the detection timing Kb till the start of exposure are stored in the NVRAM 34 of the MFP 100. At the time of image formation, these times are obtained to determine the timing at which the exposure is started based on these times. Alternatively, the mark time Tm is stored, and the timing at which the exposure is started may be calculated at the time of image formation. The first adjustment time is an inherent value for each product, and thus the time obtained by correcting the reference waiting time with the first adjustment time may be obtained and stored in advance.

Subsequently, an explanation will be made about a procedure of an adjustment time obtaining process for obtaining the first adjustment time and the second adjustment time while referring to the flowchart of FIG. 8. The adjustment time obtaining process is carried out by the CPU 31, when a mark measurement test mode is selected from among various modes for maintenance of the MFP 100 and the execution of the mark measurement test mode is instructed by an administrator of the MFP 100.

In the adjustment time obtaining process, at first, various conditions set in accordance with the instruction of execution of the mark measurement test mode are obtained (S101), the various conditions including the type of sheet, the conveyance path of sheet based on the setting of tray to be used, selection of double-sided printing or single-sided printing, and the like. Further, the reference waiting time for each model which is stored in the NVRAM 34 is read out, and a reference mark time Tm0 is obtained based on the read reference waiting time (S102).

The reference mark time Tm0 is a reference mark time based on a design value for each model. As described above, the travelling time of the conveyance belt 7 between the position where the conveyance belt 7 faces the process unit 5 and the detection position of the belt sensor 65, and the time required after the start of image formation till the start of transfer are known in advance. Therefore, the reference mark time Tm0 can be obtained based on the reference waiting time. The reference mark time Tm0 is an exemplary reference conveyance time. The process in S102 is an exemplary reference obtaining process.

One sheet is fed from the designated tray, and the conveyance of the sheet is started (S103). At this stage, the registration roller pair 62 is stopped.

Then, it is judged whether or not a predetermined time has passed after the start of conveyance of the sheet in S103 (S104). Since the registration roller pair 62 is stopped, the front end of the sheet fed from the tray is temporarily stopped in a state of abutting against the registration roller pair 62. The predetermined time in S104 is, at a minimum, a time required to get to such a state that the front end of the fed sheet abuts against the registration roller pair 62.

In a case that the predetermined time is not yet passed (S104: No), the CPU 31 waits until the predetermined time passes. In a case that it is judged that the predetermined time has passed (S104: Yes), a mark image is formed to carry out a formation measurement process in which the mark time Tm and the sensor time Ts are measured (S105).

Figure 9:
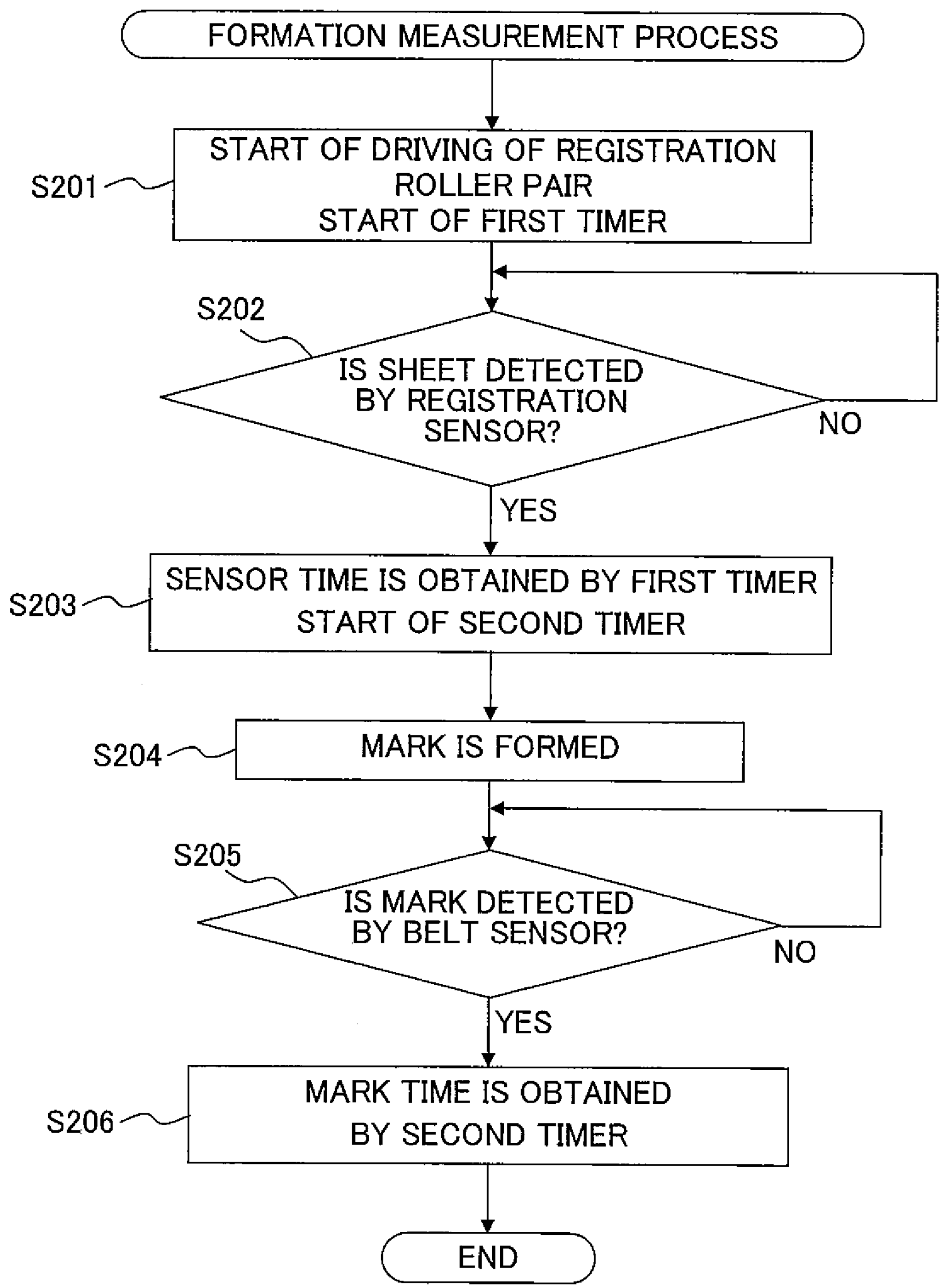
FIG. 9 is a flowchart depicting a procedure of a formation measurement process.

Subsequently, an explanation will be made about a procedure of the formation measurement process while referring to the flowchart of FIG. 9. In a case that the formation measurement process is started in the MFP 100, at first, the driving of the registration roller pair 62 is started, and at the same time a first timer is started (S201). Specifically, the electromagnetic clutch 67 is switched to the on-state to transmit the driving force to the registration roller pair 62. Thus, the front end of the sheet is conveyed from the position where the front end of the sheet is allowed to abut against the registration roller pair 62 to the position of the registration sensor 63.

The first timer may be a timer which uses a system clock of the CPU 31 or a timer which is provided independently from the CPU 31. Then, it is judged whether or not the front end of the sheet is detected by the registration sensor 63 (S202). In a case that it is judged that the front end of the sheet is not yet detected (S202: No), the conveyance is continued until the front end of the sheet is detected.

In a case that it is judged that the front end of the sheet is detected by the registration sensor 63 (S202: Yes), the first timer is stopped to obtain the sensor time Ts and a second timer is started (S203). The sensor time Ts obtained in S203 is a time elapsed after the driving of the registration roller pair 62 is started until the passage of front end of the sheet is detected by the registration sensor 63. The process in S203 for obtaining the sensor time Ts is an exemplary sheet measurement process.

Subsequently, the toner image of the mark M is formed based on the timing at which the front end of the sheet is detected by the registration sensor 63 (S204). At the time of the formation of the mark M, the reference waiting time for each model which has been read from the NVRAM 34 in S102 is used. As described above, the mark M is formed to extend over the front end of the sheet and the conveyance belt 7. S204 is an exemplary mark forming process.

Then, it is judged whether or not the rear end of the mark M is detected by the belt sensor 65 (S205). In other words, on the conveyance belt 7, the mark M is detected by the belt sensor 65. In a case that it is judged that the rear end of the mark M is not yet detected by the belt sensor 65 (S205: No), the conveyance is continued until the rear end of the sheet is detected. In a case that it is judged that the rear end of the mark M is detected by the belt sensor 65 (S205: Yes), the second timer is stopped, the mark time Tm is obtained (S206), and the formation measurement process is completed. The process for obtaining the mark time Tm in S206 is an exemplary mark measurement process.

Figure 8:
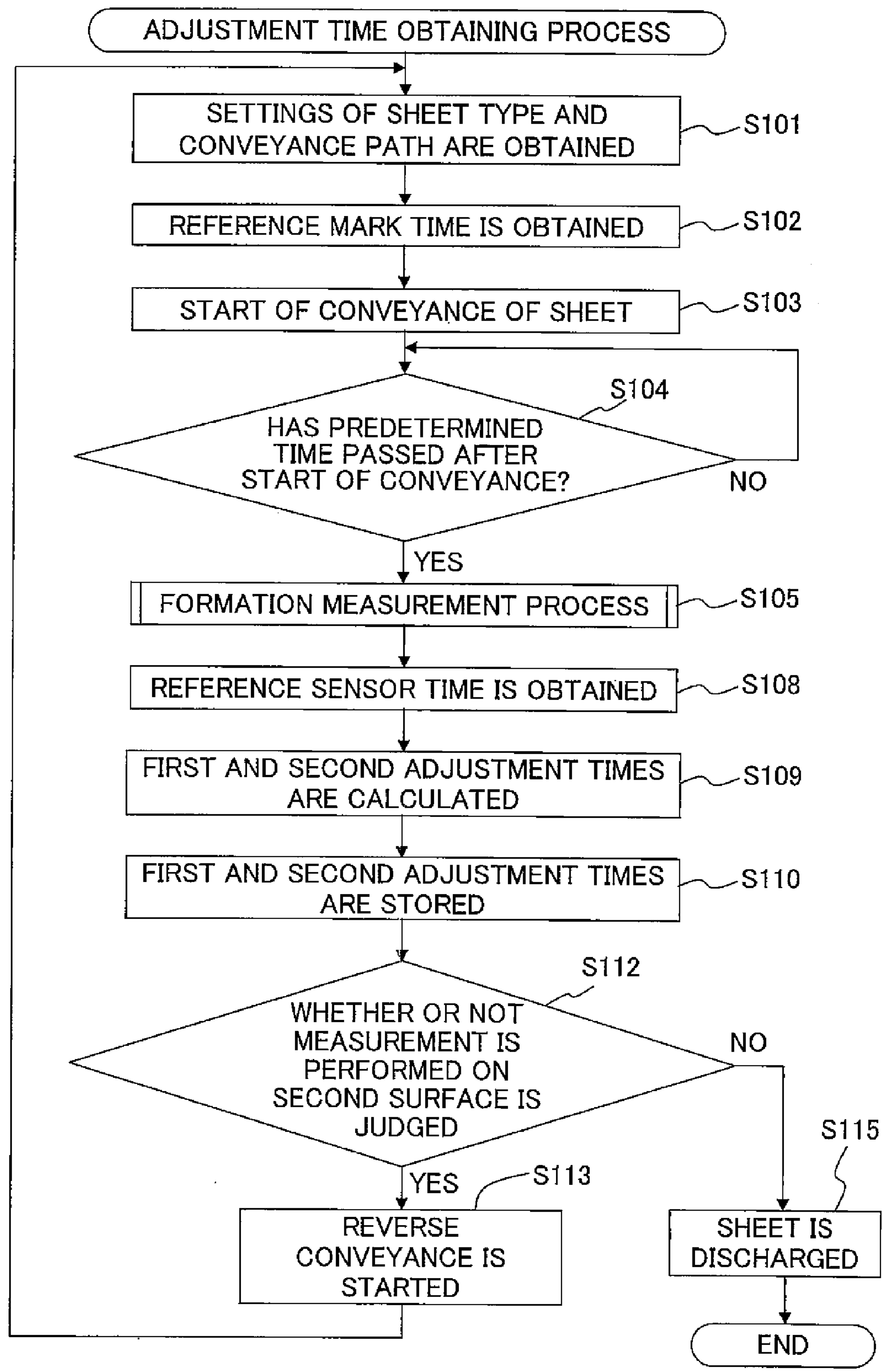
FIG. 8 is a flowchart depicting a procedure of an adjustment time obtaining process.

As depicted in FIG. 8, after the completion of the formation measurement process in S105, the reference sensor time Ts0 is obtained (S108). The reference sensor time Ts0 is a value used as a reference of the sensor time Ts. In this embodiment, the reference sensor time Ts0 is calculated from the mark time Tm based on the above expression 1.

Then, the first adjustment time and the second adjustment time are calculated (S109). In particular, the first adjustment time is obtained from the difference between the reference mark time Tm0 obtained in S102 and the mark time Tm obtained in S206. Further, the second adjustment time is obtained from the difference between the reference sensor time Ts0 obtained in S108 and the sensor time Ts obtained in S203. That is, the process in S109 corresponds to an exemplary first obtaining process and an exemplary second obtaining process.

The calculated first adjustment time and second adjustment time are stored in the NVRAM 34 (S110). In this situation, the second adjustment time is stored in a corresponding field of the table 341 (see FIG. 7) based on the conditions obtained in S101 such as the type of sheet and the conveyance path. The process in S110 corresponds to an exemplary first storage process and an exemplary second storage process.

Next, it is judged whether or not the mark measurement process is performed on the second surface (S112). That is, in a case that the instruction to perform the measurement for both sides is made through the instruction to execute the mark measurement test and that the measurement on the first surface is completed, it is judged as YES in S112. In a case that the instruction to perform the measurement for both sides is not made or that the measurement on the second surface is completed, it is judged as NO in S112.

In the case that it is judged that the measurement on the second surface is required to be performed (S112: Yes), the conveyance direction of the sheet S with the mark M formed thereon is allowed to reverse to convey the sheet to the reverse conveyance path 15 (S113), and the process returns to S101 to perform the measurement on the back surface (second surface) in the similar manner as the first surface. Then, the obtained second adjustment time is stored in the field of the second surface of the table 341. In the measurement on the second surface, the first adjustment time may or may not be stored. The reason thereof is that the difference between the first surface and the second surface is supposed to occur only in the second adjustment time. Meanwhile, in a case that it is judged that no measurement is performed on the second surface (S112: No), the sheet is discharged (S115) and the adjustment time obtaining process is completed.

Figure 10:
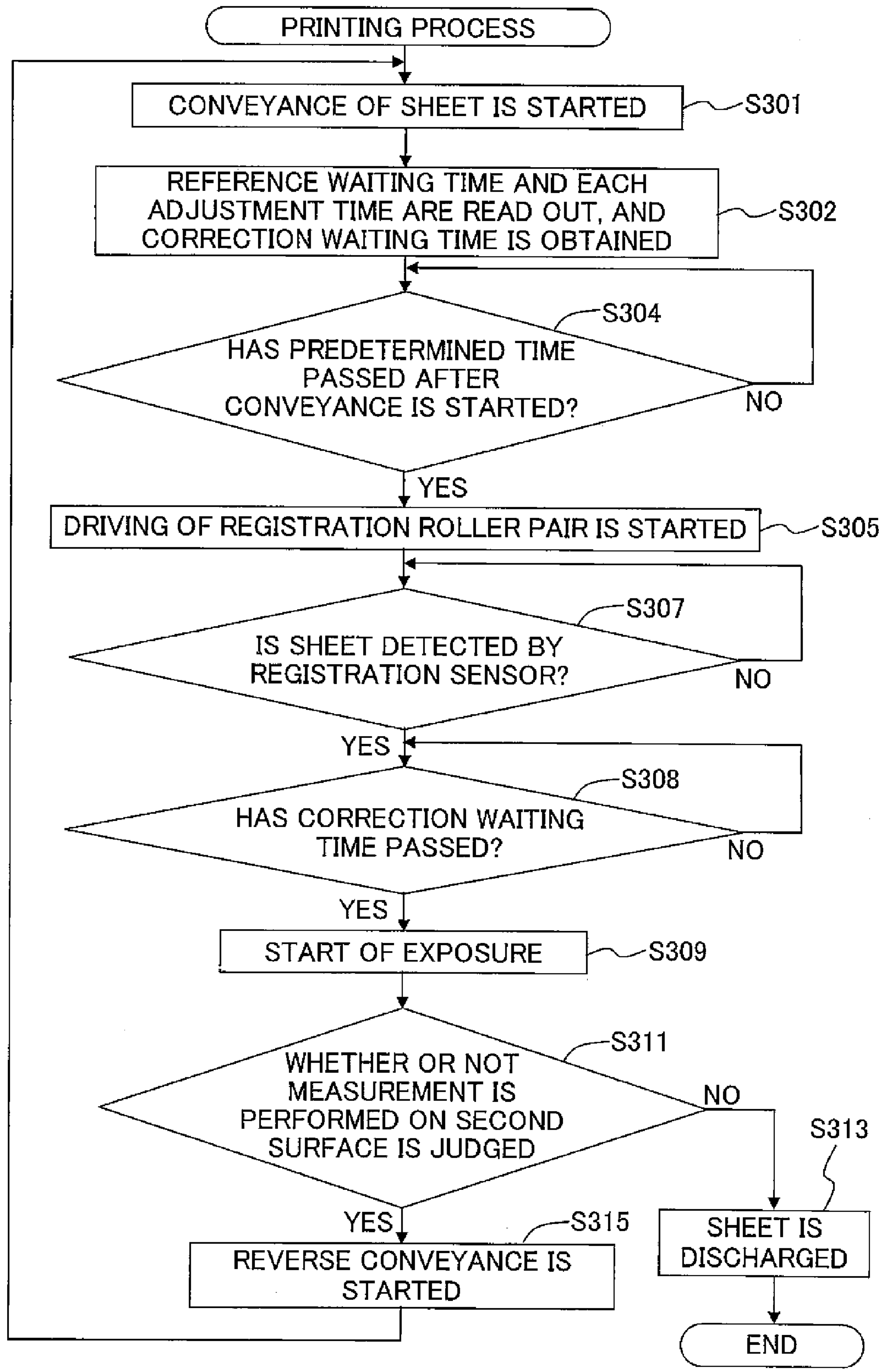
FIG. 10 is a flowchart depicting a procedure of a printing process.

Subsequently, an explanation will be made about a procedure of a printing process to execute printing by using the first adjustment time and the second adjustment time stored in the NVRAM 34, while referring to the flowchart of FIG. 10. The printing process is performed in the MFP 100 in which the first adjustment time and the second adjustment time obtained in the adjustment time obtaining process are stored in the NVRAM 34. The printing process is executed by the CPU 31, for example, by accepting the instruction to make the MFP 100 execute the printing through the operation panel 40. Here, an explanation will be made about a process for executing the printing of one sheet. As for the printing job for a plurality of pages, the similar process is performed repeatedly.

In a case that the instruction to execute the printing is accepted in the MFP 100, the conveyance of the sheet is started from a designated feed tray (S301). Further, the conditions including the type of sheet conveyed from the designated feed tray and the conveyance path are obtained.

Next, the reference waiting time, the first adjustment time, and the second adjustment time are read from the NVRAM 34 to obtain correction waiting time corrected with the first adjustment time and the second adjustment time (S302). In this situation, as the second adjustment time, a corresponding value is read from the adjustment time table 341 based on various conditions obtained in S301. The correction waiting time is, for example, a waiting time to fit or adapt the present printing which is calculated by adjusting the reference waiting time with the read first adjustment time and second adjustment time.

Then, it is judged whether or not a predetermined time has passed after the conveyance of sheet is started, in the similar manner as S104 of the adjustment time obtaining process (S304). In a case that it is judged that the predetermined time is not yet passed (S304: No), the sheet might not reach the registration roller pair 62, and thus the conveyance is continued until the sheet arrives at the registration roller pair 62. In a case that it is judged that the predetermined time has passed (S304: Yes), the driving of the registration roller pair 62 is started (S305).

Next, it is judged whether or not the front end of the sheet is detected by the registration sensor 63 (S307). In a case that it is judged that the front end of the sheet is not detected by the registration sensor 63 (S307: No), the CPU 31 waits until the detection of front end of the sheet. In a case that it is judged that the front end of the sheet is detected by the registration sensor 63 (S307: Yes), it is judged whether or not the correction waiting time obtained in S302 has passed since the detection timing (S308). In a case that it is judged that the correction waiting time is not yet passed (S308: No), the CPU 31 waits even longer.

In a case that it is judged the correction waiting time has passed (S308: Yes), an exposure process is started (S309). After S309, various operations for image formation are continuously performed. Accordingly, a predetermined blank space is created in the front end of the sheet to dispose the front of image at a proper position.

Subsequently, it is judged that whether or not the printing instruction to execute the double-sided printing is performed. That is, it is judged whether or not the instruction to perform the printing on the second surface is made (S311). In a case that it is judged that the printing instruction to perform the printing on the second surface is not performed (S311: No), the sheet is discharged (S313) and the printing process is completed.

In a case that the printing executed is the printing on the first surface in the double-sided printing, it is judged in S311 that the printing on the second surface is required to be performed (S311: Yes), and the sheet is conveyed to the reverse conveyance path 15 (S315). Further, the process returns to S302 and the second adjustment time for the second surface is read out. Then, the image formation on the second surface is executed by using the correction waiting time calculated by use of the first adjustment and the second adjustment time in the similar manner as the case of the first surface. In a case that the printing on the second surface is completed, it is judged as NO in S311 and the sheet is discharged (S313). Then, the printing process is completed.

In the case that the corrected time is stored instead of the first adjustment time as described above, the corrected time is read out and used at the time of image formation. For example, in a case that the time elapsed after the detection timing Kb of the front end of the sheet by the registration sensor 63 until the start of image formation by the process unit 5 is stored, this time is read out in S302 of FIG. 10 to obtain the correction waiting time. In this case, the reading process in S302 is a process for obtaining the time elapsed after the detection timing Kb of the front end of the sheet by the registration sensor 63 until the start of image formation by the process unit 5 based on the mark time Tm, and the reading process in S302 is an exemplary start process.

Even when the time elapsed after the detection timing Kb until the start of exposure is stored and used as described above, the second adjustment time may be used to perform an additional adjustment. Then, the variation of start timing of image formation due to the conveyance of the sheet is also prevented.

In a case that the mark time Tm is stored, the correction waiting time may be calculated based on the read mark time Tm. In this case, this calculating process is an exemplary start process. This process also allows the exposure to be started at a proper timing.

As described in detail above, the sheet is conveyed and the mark M is formed to extend over the conveyance belt 7 and the sheet as a process of the mark measurement test mode in the MFP 100 of this embodiment. Further, the rear end of a portion, of the mark M, formed on the conveyance belt 7 is detected by the belt sensor 65. Accordingly, it is measured the mark time Tm which is the time elapsed after the passage of the front end of the sheet is detected by the registration sensor 63 until the rear end of the mark M is detected by the belt sensor 65. The time elapsed after the passage of the front end of the sheet is detected by the registration sensor 63 until the image formation is started is obtained based on the measured mark time Tm, and the image formation is executed based on the obtained time. Accordingly, the printing in which the variation of start timing of image formation due to the conveyance of the sheet is prevented can be performed in the MFP 100.

The embodiment described above is a mere exemplification, and does not restrict the present teaching. Therefore, as a matter of course, various modifications and changes may be made without departing from the scope of the present teaching. For example, the present teaching is applicable to not only the MFP but also any apparatus having an image forming function such as a printer, a copy machine, and a FAX machine. Further, the present teaching is applicable to not only the image forming apparatus of the electro-photographic type but also an image forming apparatus of the ink jet type. In the image forming apparatus of the ink jet type, the start of image formation means the start of jetting or discharge of ink.

Further, it is not necessarily indispensable to perform, for example, the adjustments with the first adjustment time and the second adjustment time. For instance, the waiting time may be determined at the time of the execution of printing based on the result of the mark measurement test. In this case, for example, the mark time Tm may be read out in S302 of the printing process and used. Or, in a case that the waiting time obtained by performing the adjustment with the mark time Tm is stored in advance, the image formation may be started based on the waiting time.

Further, for example, the adjustment with the second adjustment time may not be performed. That is, in the mark measurement test mode, at least the first adjustment time may be obtained by measuring the mark time Tm, and the obtained first adjustment time may be stored. The accuracy of start timing of image formation can be improved by correcting the waiting time based on at least the first adjustment time without performing the adjustment with the second adjustment time. Noted that, in a case that the adjustment with the second adjustment time is also performed in addition to the adjustment with the first adjustment time, the start timing of image formation can be improved more accurately.

Further, for example, the mark M formed through the mark measurement process may be formed to extend over the end of the sheet and the conveyance belt 7 in the conveyance direction of the sheet. Although two marks are formed in a direction perpendicular to the conveyance direction in FIG. 5, it is allowable to form one mark. The size and position of the mark may be any size and any position, provided that the mark can be detected by the belt sensor 65. In a case that the exact length of the sheet is known in advance, the mark may be formed to extend over the rear end of the sheet and the conveyance belt 7. In this case, the mark time Tm may be obtained based on the timing at which the front end of the mark formed on the conveyance belt 7 is detected by the belt sensor 65.

Further, for example, a sensor to detect whether or not the sheet is present in the direction perpendicular to the conveyance direction may be used as a predetermined position where the start timing of measurement of the sensor time Ts is obtained, instead of the registration roller 62. For example, in a case that the sensor performing the detection in the direction perpendicular to the conveyance direction is used, the variation of detection timing caused by positional deviation in the direction perpendicular to the conveyance direction of the sheet is small. That is, even when the sheet is conveyed in a state of floating above the conveyance path 11 to some extent, the variation caused therefrom is assumed to be small. Therefore, the measurement accuracy of the sensor time Ts can be secured even when the detection timing detected by the above sensor is used as the predetermined position. The above sensor is exemplified, for example, by a photodetector and an ultrasonic sensor disposed in the direction perpendicular to the conveyance direction.

Further, for example, a sensor to detect whether or not the sheet is present in a direction which is non-orthogonal to the conveyance direction may be used instead of the registration sensor 63. In a case that the sensor performing the detection in the direction which is non-orthogonal to the conveyance direction is used, the variation of detection timing depending on the conveyance path of the sheet occurs similar to the case of the registration sensor 63. Such a sensor is exemplified, for example, by a photodetector and an ultrasonic sensor disposed in the direction which is non-orthogonal to the conveyance direction.

Further, for example, the second adjustment time stored in the NVRAM 34 is not limited to the difference between the reference sensor time Ts0 and the sensor time Ts, may be the sensor time Ts itself or a value obtained by performing the correction with a predetermined coefficient and the like. Alternatively, the second adjustment time may be obtained by referring to a comparative table or calculating table, etc., based on the calculated sensor time Ts, provided that the waiting time can be appropriately corrected at the time of image formation. Although the reference sensor time Ts0 is calculated from the mark time Tm based on the expression 1 in the above description, the present teaching is not limited to this. A value which is obtained beforehand and stored in the NVRAM 34 may be used. Each adjustment time may be an average value obtained by performing measurements a plurality of times.

Further, for example, as the conditions of the adjustment time, not only the type of sheet and the conveyance path but also the conveyance speed, temperature, humidity, and the like may be subjected to classification. Regarding the conveyance speed, the speed is distinguished, for example, as full speed or half speed. Further, for example, in a case that an apparatus including not only the feed tray 12 but also more feed trays is used, it is preferred that the field of the table 341 is created for each feed tray and each adjustment time is stored in the corresponding field.

In the above embodiment, the first adjustment time is obtained based on the time elapsed until the rear end of the mark M on the conveyance belt 7 is detected. However, the method for obtaining the first adjustment time is not limited to this. For example, the length of the mark M formed on the conveyance belt 7 in the conveyance direction may be measured to obtain the first adjustment time based on the measured length. The length of the mark M in the conveyance direction corresponds to the time elapsed after the exposure is started at the time of mark formation until the front end of the sheet arrives at the transfer position. Further, a traveling time of the front end of the sheet between the transfer position and the detection position by the belt sensor 65 is previously known. That is, the mark time Tm may be obtained based on the start timing of exposure and the length of mark M in the conveyance direction.

In such a case also, it is desired that the sensor time Ts be measured at the time of measuring the length of the mark M to also obtain the second adjustment time, and that the first adjustment time and the second adjustment time be stored. By adjusting the start timing of image formation with the first adjustment time and the second adjustment time at the time of image formation, the variation of start timing of image formation due to the conveyance of sheet is less likely to occur. As for the image forming apparatus according to the present teaching, it is not necessarily indispensable to provide the storage unit such as the NVRAM 34 which stores the first adjustment time and/or the second adjustment time. For example, the storage unit may be provided for another apparatus, which is provided to be capable of communicating with the image forming apparatus.

The processes disclosed in this embodiment may be executed by a single CPU, a plurality of CPUs, and hardware such as ASIC, or may be executed by a combination of the CPU and hardware such as ASIC. Each of the processes disclosed in the embodiment can be achieved by a recording medium storing a program for executing the process, or by various modes such as methods. It is possible to provide the above program in the form of a computer readable medium such as CDROM, DVD, or Blu-ray Disc, or in the form of a computer readable medium such as hard disk or memory disk system which is installed in a computer such as a server computer or a client computer. Further, the program may be constructed of either one program module or a plurality of program modules.

In the present description, it is also described the image forming apparatus including: the image forming unit which forms the image on the sheet; the sheet detector which is positioned on the sheet conveyance path at the upstream side of the image forming unit; the storage unit; and the controller, wherein the controller executes: the image forming process which causes the image forming unit to form the image on the sheet; the measurement process to measure the measurement time which is the time elapsed after the front end of the sheet has passes through the predetermined position until the passage of the front end of the sheet is detected by the sheet detector; the obtaining process to obtain the adjustment time for adjusting the time elapsed after the passage of the front end of the sheet is detected by the sheet detector until the image formation is started by the image forming unit, based on the measurement time; and the storage process to store the adjustment time obtained in the obtaining process in the storage unit. In such an apparatus, the time elapsed after the front end of the sheet has passed through the predetermined position until the passage of the front end of the sheet is actually detected by the detecting unit is measured to obtain, based on the measurement time, the adjustment value of the waiting time before the image formation is started. Thus, even when the deviation of the detection timing of sheet occurs for each conveyance, the image formation can be started at the timing in which the deviation is corrected.

In the present description, it is also described the image forming apparatus, wherein the controller executes the reference obtaining process to obtain the reference measurement time used as the reference of the measurement time; and the adjustment time is the difference between the measurement time and the reference measurement time. In such an apparatus, the difference between the measurement time and the reference measurement time is used as the adjustment time, and thus it is possible to obtain a more accurate adjustment value as compared with a case in which a rough adjustment time is obtained by using matrix or the like.

In the present description, it is also described the image forming apparatus including the conveyance unit to convey the sheet and the image detecting unit to detect the image formed on the conveyance unit, wherein the controller executes the mark forming process to form the mark image to extend over the conveyance unit and the sheet conveyed by the conveyance unit and the width measurement process to measure the length in the conveyance direction of the portion, of the mark image, formed on the conveyance unit based on the detection result of the image detecting unit; and the reference measurement time is calculated in the reference obtaining process based on the length measured in the width measurement process. The length of the mark image formed on the sheet is correlated with the measurement time. Thus, by obtaining the reference measurement time based on the length of the mark image, the reference measurement time in which the variation for each mark printing is adjusted can be obtained. As a result, a more accurate adjustment value can be obtained.

In the present description, it is also described the image forming apparatus including the conveyance unit to convey the sheet and the image detecting unit to detect the image formed on the conveyance unit, wherein the controller executes the mark forming process to form the mark image to extend over the conveyance unit and the sheet conveyed by the conveyance unit and the mark measurement process to measure the mark conveyance time which is the time elapsed after the passage of the front end of the sheet is detected by the sheet detector until the rear end the portion, of the mark image, formed on the conveyance unit is detected based on the detection result of the image detecting unit; and the reference measurement time is calculated in the reference obtaining process based on the mark conveyance time measured in the mark measurement process. The mark conveyance time is correlated with the measurement time. Thus, by obtaining the reference measurement time based on the mark conveyance time, the reference measurement time in which the variation for each mark printing is adjusted can be obtained. As a result, a more accurate adjustment value can be obtained.

In the present description, it is also described the image forming apparatus, wherein the predetermined position is a position where the sensor, which detects whether or not the sheet is present on the sheet conveyance path at the upstream side of the sheet detector, is provided; and the sensor provided at the predetermined position detects whether or not the sheet is present from the direction perpendicular to the conveyance direction of the sheet unlike the above described sheet detector. The variation of detection timing depending on the conveyance status is smaller, as the detection position is closer to the direction perpendicular to the conveyance direction of the sheet. Therefore, it is preferred that at least the predetermined position have high accuracy.

In the present description, it is also described the image forming apparatus, wherein the predetermined position is the registration roller pair to convey the sheet to the image formation position of the image forming unit and the controller uses the timing at which the rotation of the registration roller pair is started as the timing at which the front end of the sheet passes through the predetermined position in the measurement process. The sheet conveyed from the registration roller pair is in a state in which the inclination at the time of conveyance has been corrected. Thus, the variation of detection timing of the sheet by the sheet detector which is caused by the inclination of the sheet is less likely to occur, and thereby making it possible to obtain a more accurate adjustment value.

In the present description, it is also described the image forming apparatus including a plurality of conveyance paths to convey the sheet to the image formation position of the image forming unit, wherein the controller obtains the adjustment time for each of the conveyance paths in the obtaining process. The degree of the variation of the detection timing of sheet differs according to each of the conveyance paths. Therefore, it is preferred that the adjustment time be obtained for each conveyance path.

In the present description, it is also described the image forming apparatus, wherein the controller obtains the adjustment time for each type of sheets in the obtaining process. The degree of the variation of the detection timing of sheet differs according to each type of sheets. Therefore, it is preferred that the adjustment time be obtained for each type of sheets.

What is claimed is:

1. An image forming apparatus, comprising:

a body having an image forming unit;

the image forming unit being configured to form an image on a sheet;

a sheet detector positioned on a sheet conveyance path at an upstream side of the image forming unit;

a conveyance belt configured to convey the sheet;

an image detector configured to detect an image formed on the conveyance belt; and a controller, wherein the controller is configured to perform:

detecting a front end of the sheet by the sheet detector;

forming a mark image to extend over the conveyance belt and the sheet conveyed by the conveyance belt;

detecting the mark image on the conveyance belt by the image detector;

measuring a mark conveyance time which is a time elapsed after a front end of the sheet is detected by the sheet detector until a rear end of the mark image is detected by the image detector;

obtaining a time elapsed based on the mark conveyance time; and forming the image by the image forming unit, when the obtained time passes from the front end of the sheet is detected by the sheet detect.

2. The image forming apparatus according to claim 1, further comprising a storage, wherein the controller is configured to perform:

obtaining a reference conveyance time used as a reference of the mark conveyance time;

obtaining a first adjustment time from a difference between the mark conveyance time and the reference conveyance time;

storing the first adjustment time in the storage; and forming the image by the image forming unit, when the first adjustment time passes from the front end of the sheet is detected by the sheet detect.

3. The image forming apparatus according to claim 1, further comprising a storage unit, wherein the controller is configured to perform:

measuring a measurement time which is a time elapsed after the front end of the sheet has passed through a predetermined position until the passage of the front end of the sheet is detected by the sheet detector;

obtaining a second adjustment time from a difference between the measurement time and a reference measurement time obtained based on the mark conveyance time measured in the mark measurement;

storing the second adjustment time in the storage;

forming the image by the image forming unit, when the second adjustment time passes from the front end of the sheet is detected by the sheet detector.

4. The image forming apparatus according to claim 3, an upstream sensor is located on the predetermined position, wherein the predetermined position is on the sheet conveyance path at an upstream side of the sheet detector; and the upstream sensor is directed in a direction perpendicular to a conveyance direction of the sheet relative to the sheet detector.

5. The image forming apparatus according to claim 3, a registration roller pair is the predetermined position, the registration roller pair configured to be switched between a drive state and a stop state; and the controller is configured to perform measuring the measurement time which is a time elapsed after the registration roller pair is switched from the stop state to the drive state until the passage of the front end of the sheet is detected by the sheet detector.

6. The image forming apparatus according to claim 3, wherein the body includes a plurality of conveyance paths, the conveyance paths being configured to convey the sheet to an image formation position of the image forming unit, wherein the controller is configured to obtain the second adjustment time for each of the conveyance paths.

7. The image forming apparatus according to claim 3, wherein the controller is configured to obtain the second adjustment time for each type of sheets.

8. An image forming method of forming an image on a sheet by using an image forming apparatus, the image forming apparatus comprising:

a body having an image forming unit; the image forming unit being configured to form the image on the sheet;

a sheet detector positioned on a sheet conveyance path at an upstream side of the image forming unit;

a conveyance belt configured to convey the sheet; and an image detector configured to detect an image formed on the conveyance belt, the image forming method comprising:

detecting a front end of the sheet by the sheet detector;

forming a mark image to extend over the conveyance belt and the sheet conveyed by the conveyance belt;

detecting the mark image on the conveyance belt by the image detector;

measuring a mark conveyance time which is a time elapsed after a front end of the sheet is detected by the sheet detector until a rear end of the mark image is detected by the image detector;

obtaining a time elapsed based on the mark conveyance time; and forming the image by the image forming unit, when the obtained time passes from the front end of the sheet is detected by the sheet detector.

9. A non-transitory computer-readable medium storing a program which is executable in an image forming apparatus, the image forming apparatus comprising:

a body having an image forming unit; the image forming unit being configured to form the image on the sheet;

a sheet detector positioned on a sheet conveyance path at an upstream side of the image forming unit;

a conveyance belt configured to convey the sheet; and an image detector configured to detect an image formed on the conveyance belt, and a controller, the program being configured to cause the controller to perform:

detecting a front end of the sheet by the sheet detector;

forming a mark image to extend over the conveyance belt and the sheet conveyed by the conveyance belt;

detecting the mark image on the conveyance belt by the image detector;

measuring a mark conveyance time which is a time elapsed after a front end of the sheet is detected by the sheet detector until a rear end of the mark image is detected by the image detector;

obtaining a time elapsed based on the mark conveyance time; and forming the image by the image forming unit, when the obtained time passes from the front end of the sheet is detected by the sheet detector.

* * * * *